UNITED STATES PATENT OFFICE.

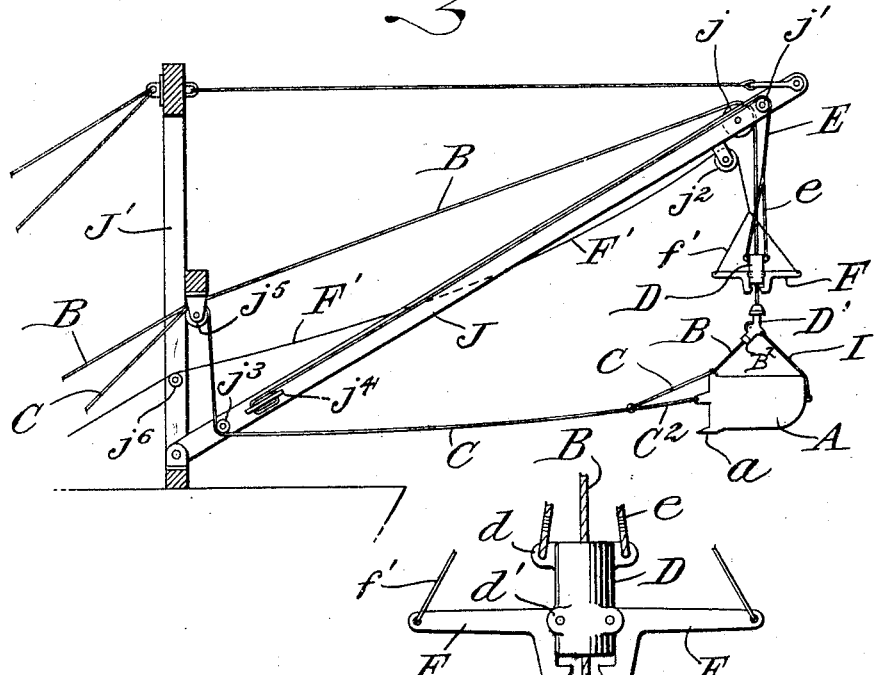
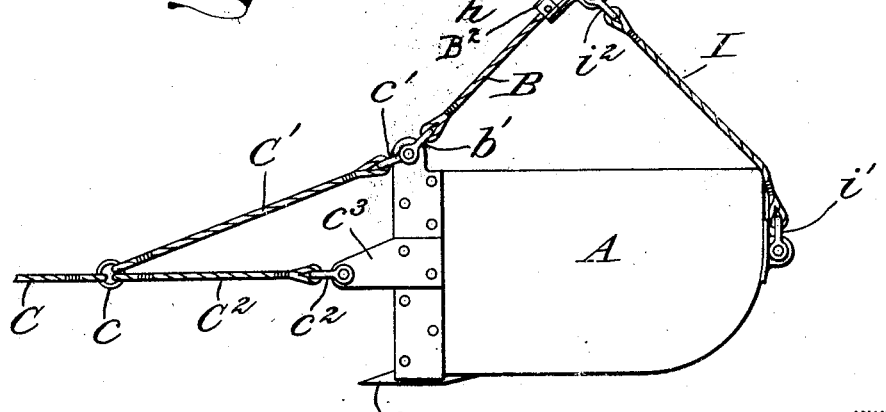

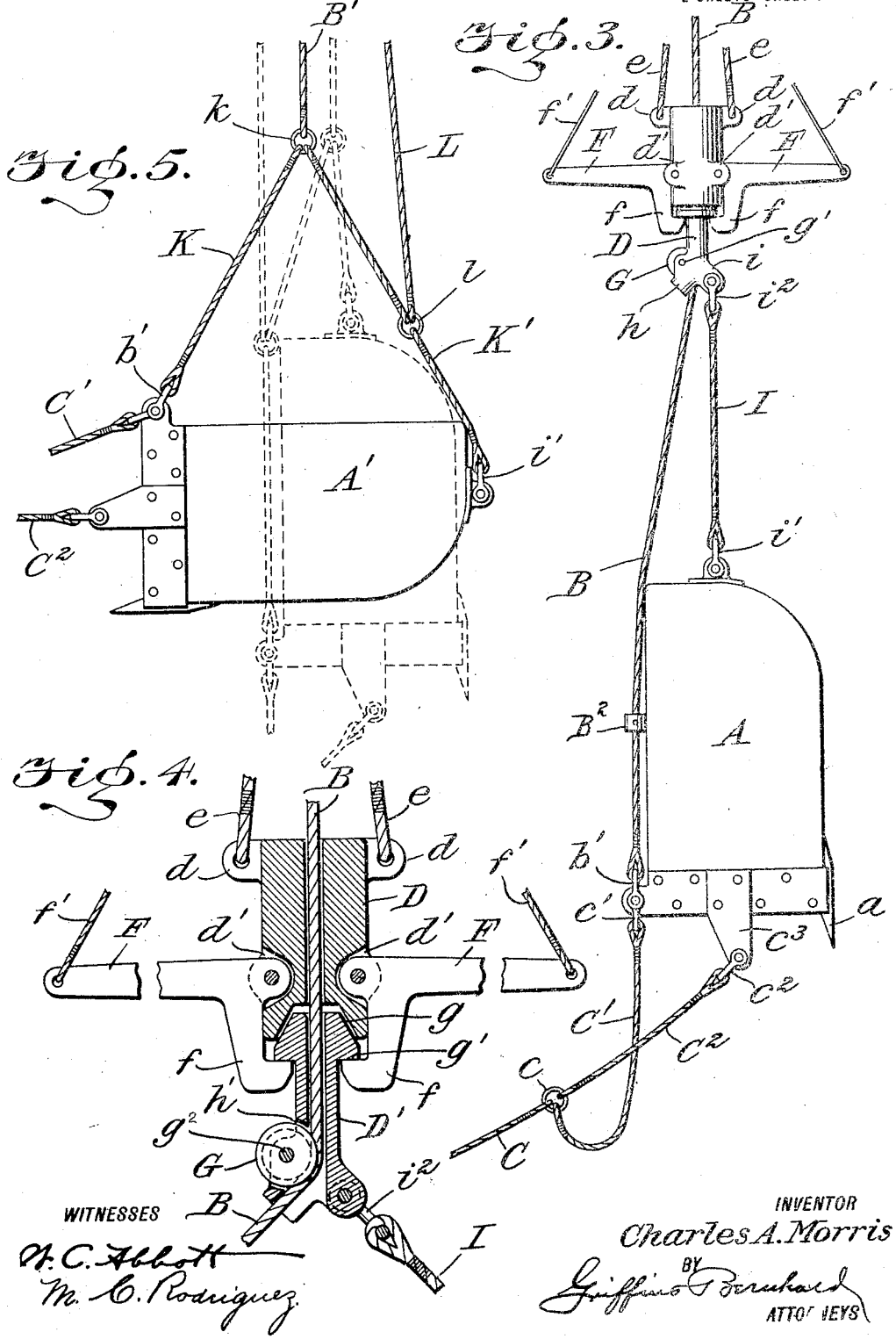

CHARLES A. MORRIS, OF MONTCLAIR, NEW JERSEY; CLARA R. MORRIS, EXECUTRIX OF SAID CHARLES A. MORRIS, DECEASED; ASSIGNOR TO THE HAYWARD COMPANY, OF NEW YORK, N. Y., A CORPORATION OF NEW YORK.

EXCAVATING SYSTEM.

1,238,801.

Specification of Letters Patent.  Patented Sept. 4, 1917.

Application filed August 11, 1913. Serial No. 784,120.

*To all whom it may concern:*

Be it known that I, CHARLES A. MORRIS, a citizen of the United States, residing at Montclair, county of Essex, and State of New Jersey, have invented a certain new and useful Excavating System, of which the following is a specification.

This invention is an excavating system of that kind wherein a drag scraper shovel is designed to be used for loading the material therein by a pull on the haul line, and thereafter the loaded shovel is hoisted to a predetermined position, locked or retained in such position, so as to allow the drag line to be slackened, and conveyed to the point of unloading, the hoisting line being provided with a stop which prevents the shovel from being lifted too high at the front end and the drag line being slackened when the shovel is suspended, but, by slackening tension on the hoisting line and while suspended at the predetermined height, the shovel is adapted to tilt or drop to a dumping position for automatically discharging the load, the drag line and hoisting line both being slackened at this time.

The excavating mechanism is employed in connection with a boom of a portable derrick or with an elevated carrier of a cableway in order that the material may be conveyed from the loading point to a more or less remote dumping point, but in this connection it is to be noted that when the loaded scraper is raised by the pull on the hoisting line to a predetermined height, said shovel is arrested and locked at that height by the automatic action of a scraper-suspending device, thus precluding the elevation of the loaded shovel to a point which dumps the shovel backwardly. It is necessary that the hoisting line shall remain under tension for the reason that the loaded bucket is thus precluded from dumping and said shovel when hoisted will remain under control or be restrained from swaying idly or at will in the air, but tension on the drag line is slackened, the mechanism operating successfully without resorting to a counterweight.

The scraper-suspending contrivance which I prefer to employ embodies two members through which the hoisting line is free to run, means for suspending one member at variable heights at which it may be desired to suspend the loaded shovel, means for connecting the other member to the shovel so that it will be retained in a certain relation thereto, and locking means operable by a trip line and carried by the suspended member in position for engagement automatically with that member which remains connected to the shovel.

In my system, the hoisting line performs a three-fold function: First, it operates primarily as a means for hoisting the shovel; second it coöperates with other parts in suspending the loaded shovel in a non-dumping position, and third, it serves the purpose of a dump line while the shovel remains in a suspended position at a predetermined height; for the reason that by slackening tension on the hoisting line the shovel is adapted to tilt or drop to an inclined or downwardly pointed position for discharging the load.

Other features of the invention and the advantages thereof will appear from the following detailed description.

In the drawings,

Figure 1 is a side elevation of an excavating apparatus embodying this invention; said apparatus being illustrated in connection with a movable boom of a derrick.

Fig. 2 is an enlarged view in side elevation of the means for hoisting and dumping the shovel, the latter being shown in a suspended non-dumping position.

Fig. 3 is a view similar to Fig. 2 with the shovel in a dumping position.

Fig. 4 is a vertical section through the stopping and locking means associated with the suspending mechanism for the shovel, and the hoisting and dumping rope line.

Fig. 5 is a side elevation of another embodiment of the invention wherein the scraper-suspending device is omitted and a separate dump line is employed.

Referring to the construction illustrated in Figs. 1 to 4, inclusive, A designates a shovel of any approved construction; said shovel is open at its front and top, but is closed at the bottom and rear. At the lower front part of the shovel is a cutting edge *a* which may be in the form of teeth or "digging toes."

B is the hoist and dump line, and C is the draft line. Said draft line is shown as having a ring *c* to which is attached a plurality of draft bridles C′ C². The draft bridle C′ is connected by a shackle *c′* to the upper forward part of the shovel, whereas the draft bridle C² is connected by a shackle c² to a forwardly extending lug c³ of the shovel, said lug c³ being positioned below the shackle c' in order that the draft bridle C² will be connected to the forward part of the shovel at a point below the attachment of the bridle C' to said forward part of the shovel. The draft bridles C' C² are unequal in length, bridle C' being longer than bridle C² so that when tension is applied to the drag line C, the bridle C² pulls on the upper forward part of the shovel so as to tilt the same to an inclined position with respect to the ground line, but, obviously, the bridles C' C² may be varied in length in order to regulate the angle of inclination of the shovel to the ground so as to control the digging capacity of said shovel.

The hoist line B in my invention operates in part as a means for suspending the shovel when loaded and hoisted in a non-dumping position, it being required that tension be maintained on this line B in order to preclude the loaded shovel when hoisted from turning to a dumping position, but when tension is slackened on said line B the shovel is adapted to turn to the dumping position shown in Fig. 3 for discharging the load therefrom.

Coöperating with this hoist and dump line B is a two-part shovel-suspending device, shown more particularly in Figs. 2, 3 and 4. Said device embodies two members D D', both of which are tubular for the hoist line to run freely therethrough. Member D is shown as consisting of a hollow casting provided with lugs d d'. To the lugs d of member D is attached a suspending bridle e of a line E. Retaining dogs F are pivoted to the lugs d' of member D, said dogs being provided with engaging members f extending inwardly toward each other and below the tubular member D. The dogs are shown as having long arms extending outwardly from the pivotal connection with lugs d', and to these arms are attached the branches of a bridle f' on a trip line F'.

Said trip line is operable at will for the purpose of simultaneously moving the dogs F.

The other member D' of the two-part scraper-suspending device is provided with a conical head g terminating in a shoulder g', the lower part h of said member D' being offset or inclined. This inclined or offset member is hollow so that the passage therein will communicate with the passage through the hollow body of said member D'. The body is provided with a slot h' in which is positioned a direction sheave G adapted to turn freely on a pin g², said sheave G being positioned at the angular part h of the member D' so as to engage with the hoist line B and reduce the frictional contact of said hoist line with hollow member D' as it runs through the latter. The member D' is provided, also, with a lug i to which is connected the upper part of a member or connection I which attaches the rear part of the scraper to one member D' of the two-part scraper-suspending device, whereby said connection I operates to support the scraper from said two-part suspending device when said scraper is turned into a dumping position. The connection I is shown as a flexible bridle one end of which is attached to the member D' by means of a shackle i², said member or bridle I being inclined from member D' toward the rear part of shovel A, to which shovel said bridle I is connected by means of a shackle i'. The hoist and dump line B is thus adapted to run freely through tubular members D D', and the lower end of said line B is connected by means of a shackle b' to the upper part of shovel A. It will thus be seen that hoist line B is connected with the upper forward part of the shovel, whereas connection or bridle I is connected with the rear upper part of said shovel, whereby the hoist line B and bridle I coöperate in suspending the loaded shovel in a non-dumping position when said shovel is hoisted, for the reason that tension is kept on the hoist line B upon the elevation of the loaded shovel. The headed end g of member D' is adapted, on the elevation of the shovel by the hoist line, to pass between the engaging members f of the dogs F until said engaging members f fit below the shoulder d' of said member D', whereby the elevation of the member D' with the shovel by the hoisting line will operate to bring member D' into engagement with member D for the purpose of arresting or stopping the upward movement of the shovel at a predetermined height, at which point the dogs F will engage with member D' so that a part of the weight of the load will be imposed upon member D, although it is necessary to keep tension on hoist line B to prevent the shovel from turning to a dumping position.

In the construction shown, the hoist line B is provided with a stop B², the same being secured to the line at a point adjacent to the shackle connection b' between the line and the forward upper part of the scraper. Now, when the scraper is loaded by the pull on the drag line, and strain is applied to the hoist line B, the latter runs through the members D D' of the trip and lock device until the stop B² on the hoist line contacts with the member D', see Fig. 2, thus arresting the further running movement of the hoist line through member D' and preventing the hoist line from lifting the front end of the scraper too high so that there is no tendency of the hoist line to lift the scraper too far and dump it from the back end.

The rigging of the lines for operating the excavating shovel is shown in Fig. 1 in connection with a swinging boom J of a derrick J', the latter being of the usual or any preferred construction. On this boom are a series of pulleys $j$ $j'$ $j^2$ $j^3$ and a cleat $j^4$. The hoist line B runs upwardly from the shovel through members D' D, over pulleys $j$ and thence to a suitable power drum. The drag line C extends from the shovel beneath the pulley $j^3$ and over pulley $j^5$ to a suitable power drum. The suspending line E for member D runs freely over pulley $j'$ and is wound around the cleat $j^4$, whereas the trip line F' extends over pulley $j^2$ to a pulley $j^6$ so that the trip line is in convenient reach of the operator.

In operation the boom is swung over the loading point and by slackening on the lines B C the shovel is dropped upon the material. The pull of the drag line C draws the shovel in a forward direction and cuts through the material so as to fill said shovel. Tension is now applied to the hoist line B so as to pull it through members D D' until the stop B² contacts with member D', whereupon the shovel is lifted by the coöperation of bridle I with the hoist line. The operation of lifting the shovel by the hoist line continues until the head of member D' is engaged by dogs F, the hooks $f$ of which fit beneath the shoulder $g'$ of member D'. As a result of the locking engagement between the part D' and dogs F the loaded shovel is suspended at a proper height from member D by the hoist line and the bridle, said hoist line being kept under tension and the shovel being retained in the raised non-dumping position. At this time tension is kept on the drag line C so as to preclude the shovel from swaying in mid-air, although it is not necessary to maintain the tension tightly on said drag line, whereby the shovel when suspended is under control by the drag line and the hoist line. The boom may now be swung to the point at which it is desired to discharge the load, and by slackening tension on the hoist line the shovel will turn to the dumping position, shown in Fig. 3, wherein the bridle I, and members D D' and trip line F' coöperate to sustain the weight of the shovel from the suspending line E. After discharging the load the trip line F' is operated so as to release the dogs from member D', whereupon the hoist line B is paid out and the shovel will drop by gravity upon the ground, after which the operations will be repeated.

It is evident that the suspending line E may be operated at will for the purpose of raising or lowering the member D of the two-part suspending device in order to engage member D' of the shovel at different heights. This is advantageous for the reason that the shovel when loaded may be suspended according to the height of the spoil bank or other material at the unloading point.

Although I have shown and described a preferred form of the invention wherein the two-part scraper-suspending device is used in connection with a suspending line F', and the functions of hoisting and dumping the loaded shovel are performed by a single line B, it is not desired to limit the invention to the use of these devices, for the reason that I may use a separate dump line and omit the two-part scraper-suspending device. This form of the invention is illustrated in Fig. 5 wherein A' designates the shovel, C', C² the draft bridles connected with the shovel and the drag line in the manner described; and B' is the hoist line. Said hoist line is connected to a ring $k$, and to this ring are attached the upper ends of two suspending bridles K K'. Bridle K is connected by shackle $b'$ to the upper forward part of the shovel, whereas bridle K' is connected by shackle $i'$ to the rear upper part of the shovel. Said bridle K is provided intermediate its ends with a ring $l$ to which is connected a separate dump line L. The shovel of Fig. 5 is adapted to be operated by the drag line and the hoist line, substantially as hereinbefore described, but when the suspended shovel has been carried to the dumping point, tension is slackened on hoist line B', and dump line L is kept in a taut condition, whereupon the weight of the shovel is imposed upon the dump line L, and said shovel is free to turn into the dumping position, shown in dotted lines, for the purpose of discharging the load.

Having thus fully described the invention, what I claim as new, and desire to secure by Letters Patent, is:—

1. In a device of the class described, the combination with a load carrier, of a suspending member, means connecting said suspending member with one part of the load carrier, a hoist line attached to another part of the load carrier and free to run relatively to the suspending member, means for retaining the suspending member at a fixed height, and a stop separate from the load carrier for limiting the hoisting movement of the hoist line relatively to the suspending member so that tension on the hoist line retains the load carrier in a hoisted and non-dumping position, said load carrier being dumped by relaxing tension on the hoist line.

2. In an excavating apparatus, the combination with a scraper, of a suspended stop device embodying two coöperating members and a locking device, a bridle attached to the scraper and to one of said members, and a hoist line running freely through the members of said stop device and attached to the scraper, said hoist line coöperating with the bridle in retaining the scraper in a non-dumping position and operating by slack in the line to drop the scraper point downward.

3. In an excavating apparatus, the combination with a scraper, of a two-part suspending mechanism, one of said parts being connected with the scraper for movement therewith and means for effecting a locking engagement between the two parts of said suspending mechanism so as to suspend the scraper in a dumping position and at a predetermined height, and a hoist line attached to said scraper and having a running connection with said suspending mechanism, said scraper being retained in a hoisted non-dumping position by maintaining tension on said hoist line.

4. In an excavating apparatus, the combination with a scraper, of a suspending bridle connected with an end portion of the scraper, a hoist line, means for connecting said hoist line with the opposite end portion of the scraper, said hoist line and the bridle coöperating in retaining the scraper in a non-dumping position by maintaining tension on the hoist line, means operable by a relaxation of tension on the hoist line for effecting a variation in the relative lengths of the bridle and the hoist line to dump the hoisted scraper point downward, and a drag line connected to the forward part of the scraper, said drag line operating to control the suspended scraper so as to preclude undue swaying thereof.

5. In an excavating apparatus, the combination with a scraper provided with a cutting edge, and a haul line connected with said scraper, of a scraper suspending member, a second scraper suspending member normally connected with the rear of said scraper, means for locking the second suspending member to the first suspending member, and a hoist line attached to the front of the scraper and having running engagement with the first and second named suspending members, said hoist line being under tension for hoisting the scraper and for effecting the locking engagement of the first suspending member with the second suspending member and said hoist line being free by slackening tension thereon to run freely with respect to the first and second suspending members in dumping the scraper.

6. In an excavating apparatus, the combination with a scraper and a haul line connected therewith for loading the scraper, of a suspending member having means for connecting it with said scraper, means whereby the elevation of said suspending member may be varied, and a hoist line slidable freely with respect to the suspending member and attached to said scraper, said hoist line operating independently of the haul line for hoisting said scraper to a predetermined position relative to the suspending member and said hoist line being retained under tension so as to retain the scraper in a non-dumping position.

7. In an excavating apparatus, the combination with a scraper and a haul line connected with said scraper for loading it, of a suspending member, a bridle connecting said scraper with said suspending member, a hoist line separate from the haul line and attached to the scraper, a stop for arresting the movement of said hoist line with respect to said suspending member, said hoist line operating independently of the haul line to hoist the scraper and the suspending member to a predetermined height, and means engageable with the suspending member when hoisted for supporting the weight of the loaded scraper, said hoist line being under tension for retaining the scraper in a non-dumping position.

8. In an excavating apparatus, the combination with a scraper, of a two-part suspending device, means for supporting one part thereof at a predetermined height, a bridle connecting the other part of said suspending device with the scraper, and a hoist line free to run through said suspending device and attached to the scraper, said hoist line being under tension for retaining the scraper in a non-dumping position, and said scraper being free to turn into a dumping position when tension is slackened upon said hoist line.

9. In an excavating apparatus, the combination with a scraper, of a two-part suspending device, means for supporting one part thereof at a predetermined height, a latch releasable at will for retaining said two parts in fixed relation, a bridle connecting the other of said parts to the scraper, and a hoist line attached to the scraper, said hoist line being free to run through said parts of the suspending device for permitting the shovel to turn into a dumping position.

10. In an excavating apparatus, the combination with a scraper, of a two-part suspending device, a bridle attached to one part thereof and to the rear of said scraper, a hoist line attached directly to the forward part of the scraper, said hoist line being free to run relative to the suspending device, and means controllable at will for retaining the two parts of the suspending device in locked relation, said scraper being retained in a non-dumping position by tension on the hoist line, and upon slackening said hoist line said scraper is free to turn into a dumping position.

11. In an excavating apparatus, the combination with a scraper, of a two-part suspending device, a bridle attached to one part thereof and to the rear of said scraper, a hoist line attached directly to the forward part of the scraper, said hoist line being free to run relative to the suspending device, latch mechanism positioned on one of said parts for engagement with the other part so as to adapt the bridle to suspend the scraper when the latter turns into a dumping position, and means for releasing the latch mechanism, said scraper being retained in a non-dumping position by tension on the hoist line, and upon slackening said hoist line said scraper is free to turn into a dumping position.

12. In an excavating apparatus, the combination with a scraper and a haul line connected with said scraper for loading the same, of a hoist line connected with the scraper for hoisting the same to a predetermined height, and means for taking off the hoist line the weight of the scraper when the latter shall have been elevated to a predetermined height by the action of said hoist line, said scraper being retained in a non-dumping position by tension on the hoist line and independently of the action of the haul line.

13. In an excavating apparatus, the combination with a scraper, and a haul line connected therewith for loading the same, of a hoist line separate from the haul line and connected with the scraper for hoisting the latter to a predetermined height, and means adapted to be positioned at variable heights relative to the loading point and coöperating with the hoist line for taking off said hoist line the weight of the loaded scraper subsequent to the action of said hoist line in hoisting the scraper, said scraper being retained in a non-dumping position by tension on the hoist line and independently of the action of the haul line.

14. In an excavating apparatus, the combination with a scraper, of a separable two-part suspending device, a bridle connected to the scraper and to one part of the suspending device, means for supporting the other part of said suspending device at a predetermined height, and a hoist line attached to the scraper and having running engagement with said suspending device, said hoist line and the bridle coöperating in retaining the scraper in a non-dumping position and said two-part suspending device operating independently of the hoist line in supporting the loaded and hoisted scraper at the predetermined height.

15. In an excavating apparatus, the combination with a scraper, of a suspended member, means for varying at will the elevation of said suspended member, a second member, means normally connecting the second member with the scraper so that the second member and the scraper are movable conjointly, a hoist line having a running connection with the suspended member and the second member, a stop movable with the hoist line and adapted for contact with the second member, said hoist line being attached to the scraper and coöperating with the second member in suspending the scraper in a non-dumping position, and means for locking the second member to the suspended member when the scraper is elevated by the hoist line to a predetermined position, said scraper being retained in a non-dumping position by tension on the hoist line.

16. In an excavating apparatus, the combination of a scraper, a suspended member, a second member connected with the scraper and movable therewith relatively to the suspended member, a hoist line having a running engagement with the suspended member and the second member, said hoist line being directly connected to the scraper and coöperating with the second member in suspending the scraper in a non-dumping position, and a drag line independent of the suspending member and the second member, said drag line being attached to the scraper for hauling it into the material and for restraining said scraper from swaying during the hoisting thereof toward the suspended member.

17. In an excavating apparatus, the combination with a scraper provided with a cutting edge, and a haul line connected to said scraper, of a scraper suspending member, means for supporting the latter at variable heights, a second scraper suspending member normally connected with the scraper near one end thereof, means for locking the second suspending member with said first scraper suspending member, and a hoist line attached to the scraper near the opposite end thereof, said hoist line having running engagement with both said scraper suspending members and being under tension for hoisting the scraper and for elevating the second scraper suspending member into locking engagement with the first scraper suspending member, whereby said hoist line may be slackened for imposing the weight of the hoisted scraper upon the coöperating scraper suspending members and thereby permit the scraper to assume a dumping position.

18. In a device of the class described, the combination with a load carrier, of a two-part suspending device, means for supporting at a fixed height one part of the suspending device, locking means for detachably connecting the two-parts of said suspending device, means normally connecting an end portion of the load carrier with one part of the suspending device, a hoist line free to run relatively to the two-parts of said suspending device, and a stop on the hoist line for arresting the elevation of the load carrier, said hoist line being under tension for retaining the load carrier in a non-dumping position and said hoist line operating, by a relaxation of tension thereon, to permit the load carrier to turn by gravity into a dumping position.

19. In a device of the class described, the combination with a load carrier, a suspending member therefor, and means for supporting the suspending member at a fixed height, of a flexible connection intermediate the load carrier and said suspending member, a hoist line free to run relatively to the suspending member, and a stop separate from the load carrier for limiting the hoisting movement of the hoist line with respect to the suspending member, said hoist line operating to elevate the suspending member and the load carrier and said hoist line being under tension to retain the load carrier in a non-dumping position, whereby the relaxation of tension on the hoist line permits the load carrier to turn by gravity into a dumping position.

20. In a device of the class described, the combination with a suspending device, and means for supporting it at a fixed height, of a load carrier open at one end and closed at the other end, means connecting the closed end of said load carrier with the suspending device and operating upon dumping the load carrier to suspend the same point downward from said suspending device, a hoist line attached to the open front end portion of the load carrier, said hoist line being free to run through the suspending device and operating to raise the load carrier to a non-dumping position and to hoist said load carrier to a desired height, and stopping means for arresting the running movement of said hoist line relatively to the suspending device, said hoist line operating by tension thereon to retain the load carrier in a non-dumping position and by relaxation of tension thereon to permit said load carrier to turn into a dumping position.

21. In a device of the class described, the combination with a suspending device, and means for supporting the same at a fixed height, of a load carrying bucket provided with a closed rear end portion and an open digging end portion, means connecting said closed rear end portion with said suspended device and operating to suspend said bucket point downward from said suspending device, a hoist line attached to said bucket at the open digging end portion thereof and having running engagement with the suspending device, a haul line separate from the hoist line and attached to said bucket at the front digging portion thereof, said hoist line operating to raise the bucket to a non-dumping position and to hoist said bucket to a desired height, and stopping means for arresting the running movement of the hoist line relatively to the suspending device, said hoist line operating by tension thereon to retain the bucket in a non-dumping position independently of any latching action and by relaxation of tension on said line to permit the bucket to turn by gravity into a dumping position.

In testimony whereof I have signed my name to this specification in the presence of two subscribing witnesses.

CHARLES A. MORRIS.

Witnesses:
H. I. BERNHARD,
M. C. RODRIGUEZ.